United States Patent
Reidel

(10) Patent No.: US 9,073,676 B2
(45) Date of Patent: Jul. 7, 2015

(54) GOALIE TOE HOOK

(71) Applicant: REIDEL TOEHOOK INC., Kitchener (CA)

(72) Inventor: Wayne Reidel, Kitchener (CA)

(73) Assignee: Reidel Toehook Inc., Kitchener (CA)

( * ) Notice: Subject to any disclaimer, the term of this patent is extended or adjusted under 35 U.S.C. 154(b) by 220 days.

(21) Appl. No.: 13/741,874

(22) Filed: Jan. 15, 2013

(65) Prior Publication Data

US 2013/0232728 A1 Sep. 12, 2013

Related U.S. Application Data

(60) Provisional application No. 61/607,742, filed on Mar. 7, 2012.

(51) Int. Cl.
| | |
|---|---|
| A63B 71/12 | (2006.01) |
| A63B 71/08 | (2006.01) |
| B65D 63/00 | (2006.01) |
| B23P 11/00 | (2006.01) |
| A43B 5/16 | (2006.01) |

(52) U.S. Cl.
CPC ............. *B65D 63/00* (2013.01); *Y10T 24/1397* (2015.01); *Y10T 29/49947* (2015.01); *A63B 2243/0041* (2013.01); *A63B 71/1225* (2013.01); *B23P 11/00* (2013.01); *A43B 5/16* (2013.01); *A63B 2071/1283* (2013.01); *A63B 2071/1258* (2013.01); *A63B 2071/1275* (2013.01); *A63B 2243/0045* (2013.01)

(58) Field of Classification Search
CPC .................. A63B 71/1225; A63B 2243/0041; Y10S 2/911; Y10T 24/1397; Y10T 24/44026; Y10T 24/44017
USPC .................................................. 24/3.13; 2/22
See application file for complete search history.

(56) References Cited

U.S. PATENT DOCUMENTS

| | | | | |
|---|---|---|---|---|
| 4,778,197 | A * | 10/1988 | Floreani ........................ | 280/602 |
| 4,903,698 | A * | 2/1990 | Huber et al. .................. | 606/235 |
| 5,005,239 | A * | 4/1991 | Clark ................................ | 5/669 |
| 5,301,911 | A * | 4/1994 | Beauchemin .............. | 248/218.4 |
| 5,497,818 | A * | 3/1996 | Marcarelli ..................... | 150/134 |
| 5,842,240 | A * | 12/1998 | Kato et al. ....................... | 4/633 |
| 7,152,246 | B2 * | 12/2006 | Infante ............................... | 2/22 |
| 2003/0046746 | A1* | 3/2003 | Norbutt .............................. | 2/22 |
| 2008/0148531 | A1* | 6/2008 | Buckley ...................... | 24/265 H |
| 2013/0219668 | A1* | 8/2013 | Bredesen et al. ............. | 24/3.13 |
| 2014/0259539 | A1* | 9/2014 | Ringgenberg et al. ............ | 24/13 |

* cited by examiner

*Primary Examiner* — Robert J Sandy
*Assistant Examiner* — Louis Mercado
(74) *Attorney, Agent, or Firm* — Gowling Lafleur Henderson LLP; Jeffrey W. Wong

(57) ABSTRACT

A method and apparatus for a quick and simple method of securing the bottom of a goalie leg pad to their skate toe area. The apparatus includes a toe hook including a flat portion and a hook portion which is attached to the goalie pad. The apparatus also include an extension which has loop portions at each end which is attached at one end to the goalie skate and then has its other loop portion connected to the hook portion of the toe hook to attach the goalie leg pad to the goalie skate.

8 Claims, 5 Drawing Sheets

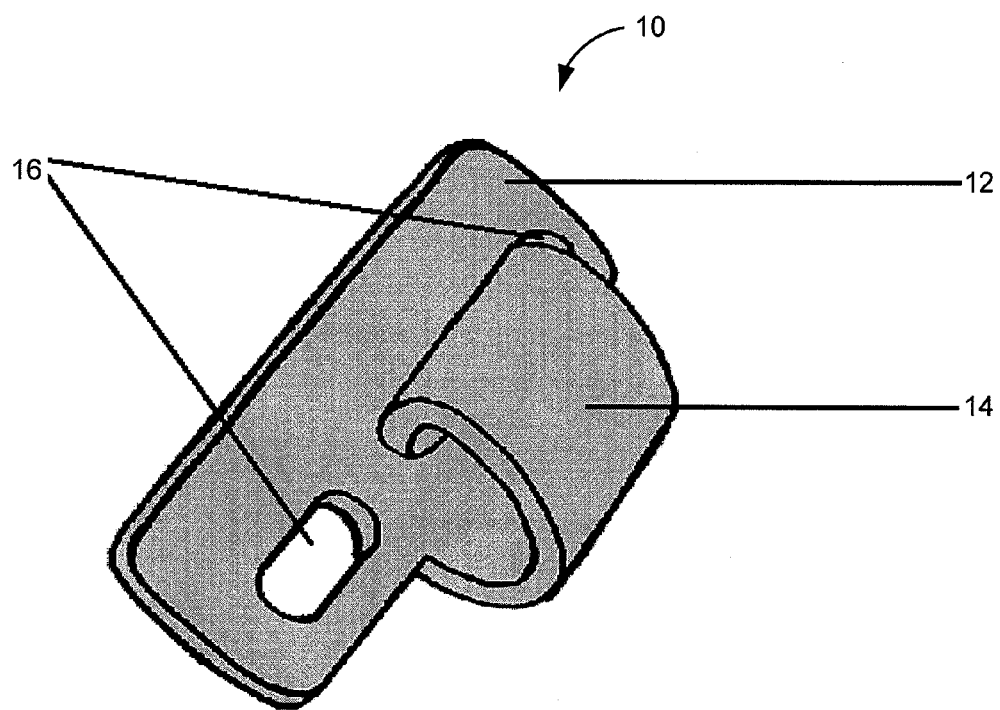
- Figure 1 -
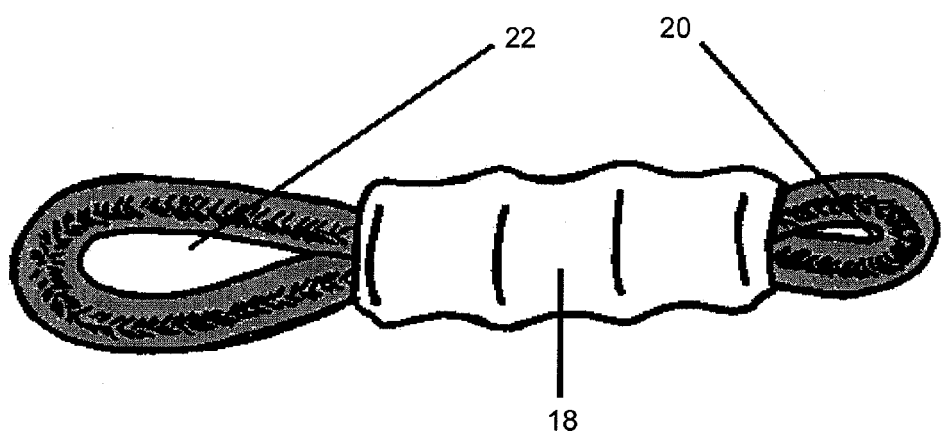
- Figure 2 -

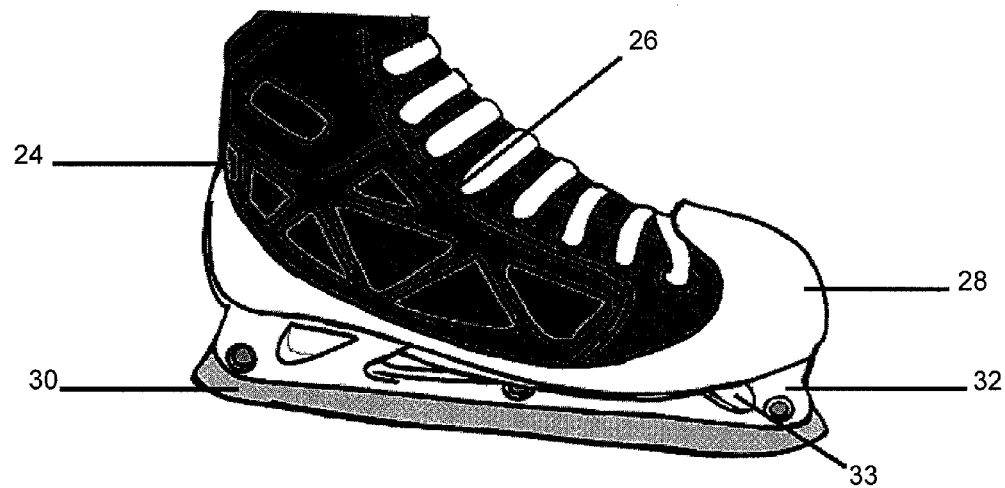
-Figure 3 -
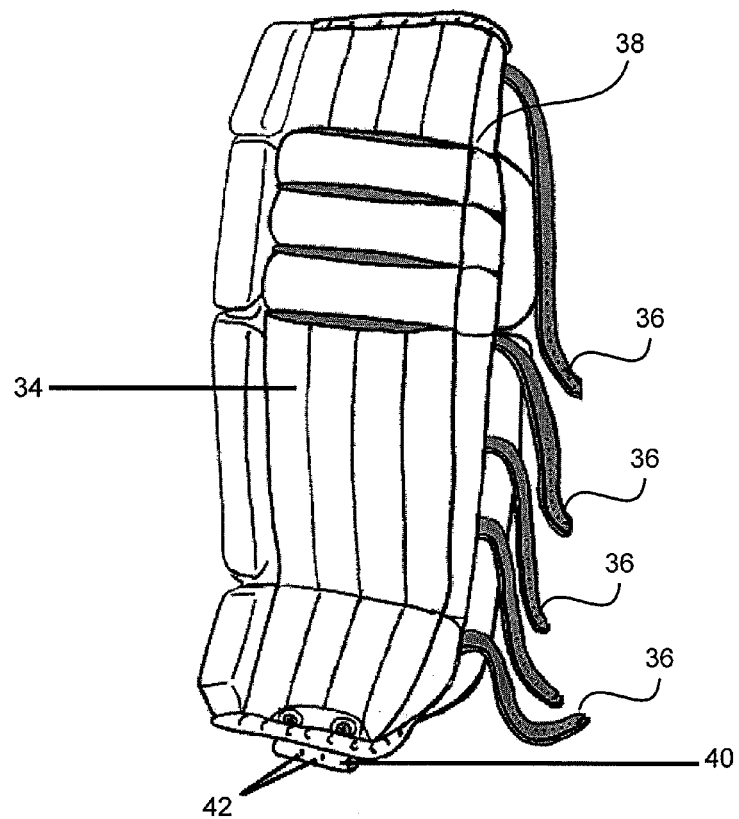
- Figure 4 -

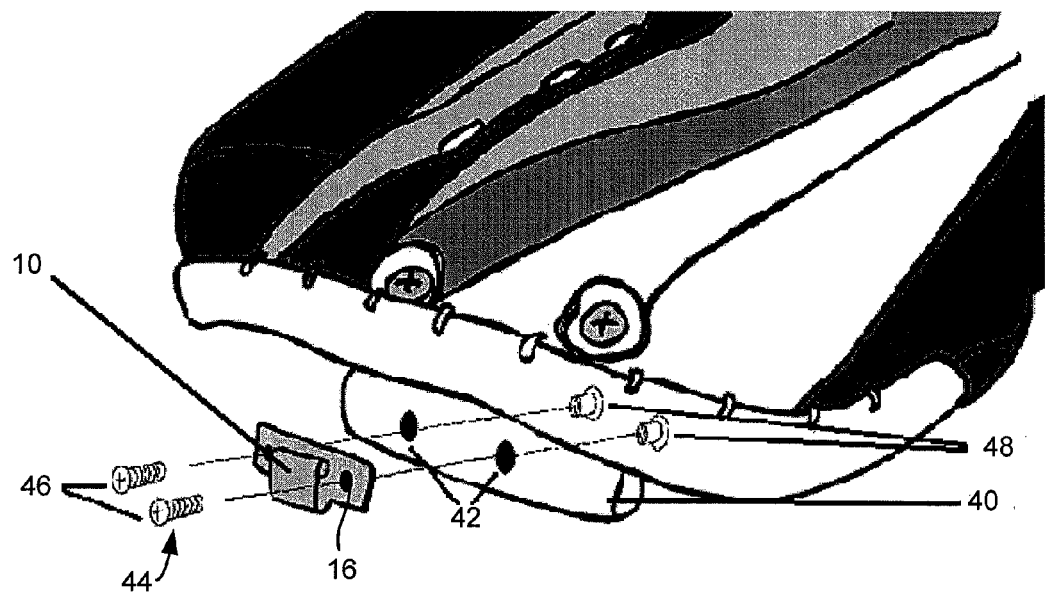
- Figure 5 -
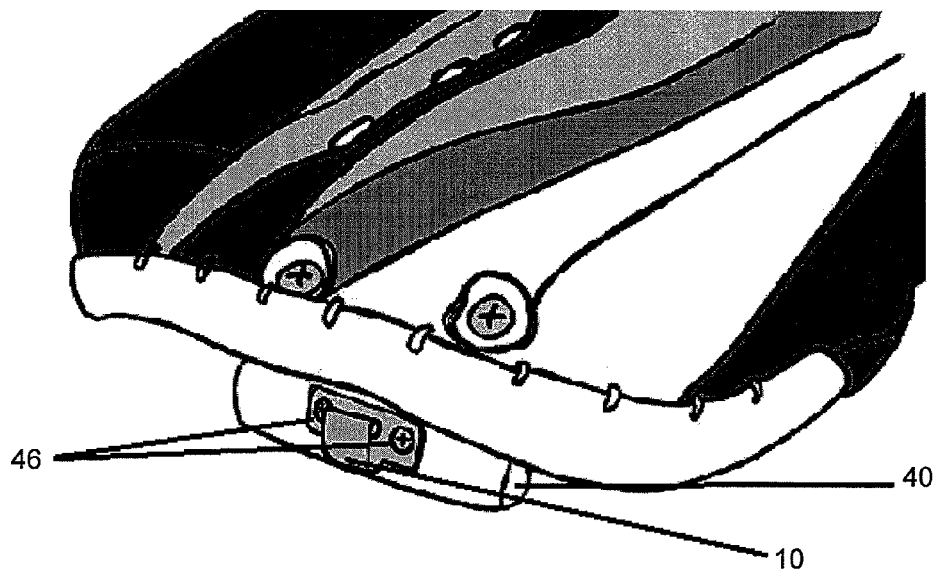
- Figure 6 -

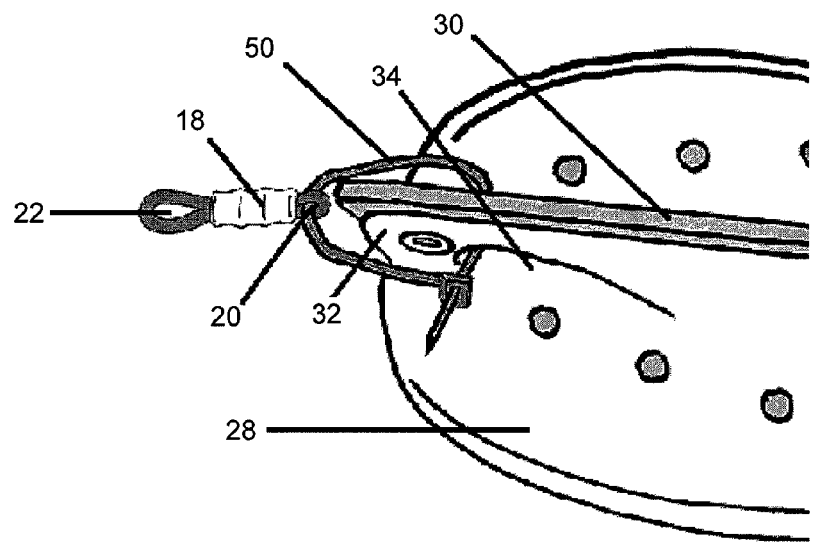
- Figure 7 -
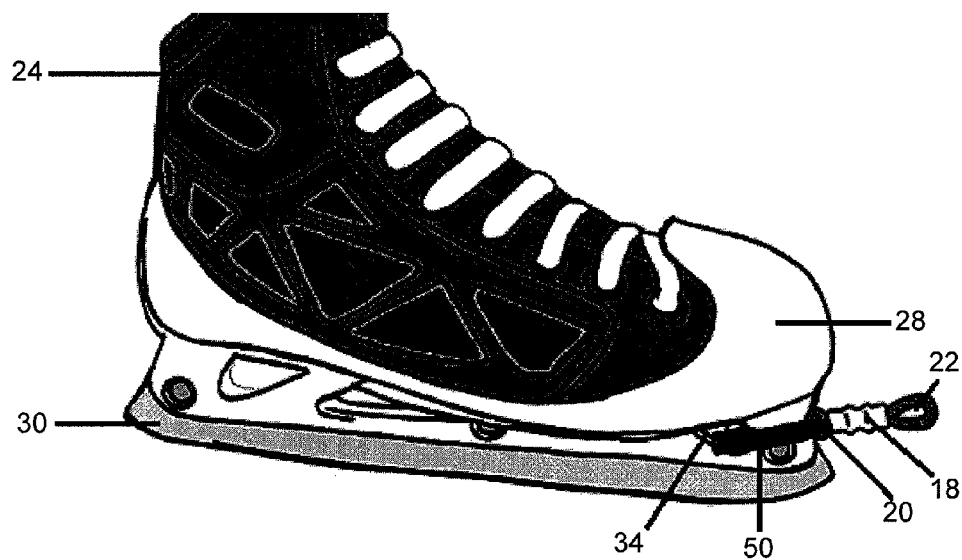
- Figure 8 -

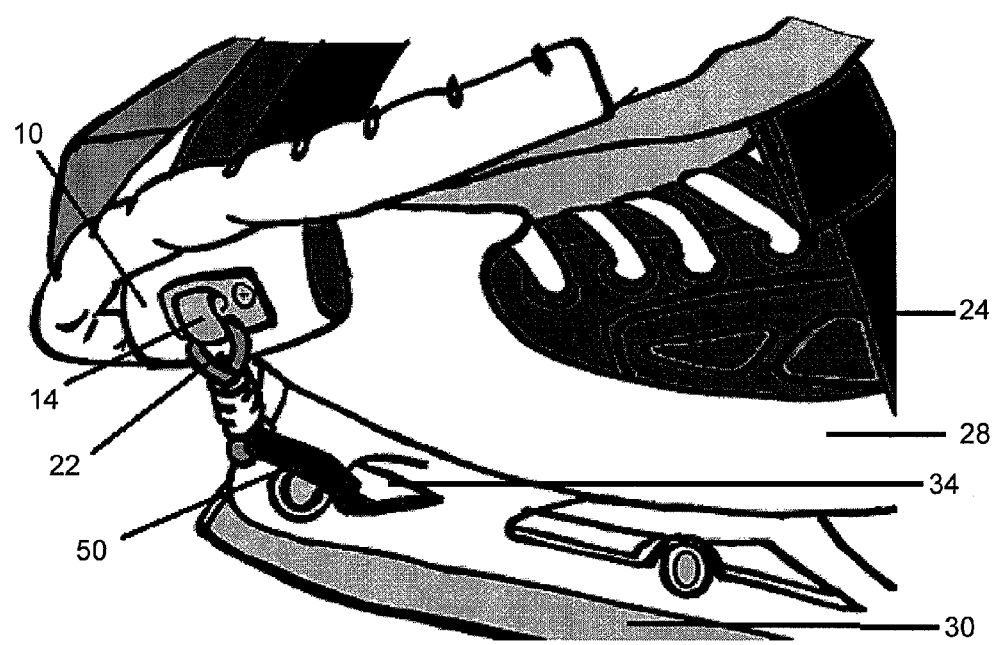
- Figure 9 -

GOALIE TOE HOOK

CROSS-REFERENCE TO RELATED APPLICATIONS

This application claims the benefit of priority of U.S. Provisional Patent Application No. 61/607,742 filed Mar. 7, 2012, which is incorporated herein by reference in its entirety.

FIELD OF DISCLOSURE

This disclosure pertains generally to sporting equipment and more specifically to a toe hook for securing a goalie pad to a hockey skate.

BACKGROUND OF THE DISCLOSURE

In ice hockey, goaltenders, or goalies, wear very specialized equipment to protect themselves from the many possibilities of injury. Typically, goalies wear goalie leg pads which are bulky, yet lightweight, to protect the goalie while still allowing for freedom of movement while he/she is attempting to stop a rubberized projectile (puck) from getting into a net.

Goalie leg pads have evolved from fairly heavy leather pads filled with horsehair, to the much lighter foam-filled nylon and thinner leather leg protectors that are being used today. The leg pads are designed to attach to the goalie's leg and hockey skates, such as a goalie skate, to allow a goalie to use their legs to block pucks and to also safely fall to their knees on the ice surface. The pads are designed in such a way that the goalie can get back up quickly, once he/she is on the ice. It is beneficial for the leg pad to attach securely to the toe of the skate to help give the goalie complete control of the leg pad so that the leg pads react correctly to a goalie's actions. Currently, this involves a meticulous attachment of the leg pads' buckles and straps to the goalie's legs and skates.

Goalies are often classified in three styles of play. One style is a stand-up goalie which refers to a goalie that prefers to stay in a stand-up position to stop pucks. A stand-up goalie slides and shuffles side to side and relies on control of the goalie stick and skates to stop most low shots. This goalie usually wears the goalie leg pads very snug to the toe of the skates. The second style is a butterfly goalie which spreads their legs flat on the ice to stop low shots. Some of these goalies like to wear their leg pads loose to allow the pads to lay as flat as possible on the ice to cover as much of the lower area of the net as possible. The third style is a hybrid or combination of the first two where the goalies use either setup on their leg pads depending on their personal preference.

The current method of securing a goalie leg pad to a skate is to connect the toe of the goalie hockey skate to the toe area of the leg pad via a pair of laces attached to a toe bridge of each goalie leg pad. The laces are then intertwined around the underside of the skate and brought up around to the topside of the skate and then tightly tied. This is a process where the player bends over in a sitting position to accomplish and often takes two to three minutes per skate. Moreover, it can be a difficult task for youths, parents, juniors and seniors as the lacing must be done correctly to avoid mishap caused by loose or poorly tied knots.

Therefore, there is provided a novel method, system and apparatus for securing a hockey skate to a goalie leg pad.

SUMMARY OF THE DISCLOSURE

The disclosure is directed at a method, system and apparatus for securing a goalie leg pad to a goalie skate. In one embodiment, this disclosure improves the securing of the pad and simplifies the task. One advantage of the disclosure is that it saves significant time and effort attaching the leg pad to the goalie skate. This disclosure reduces or eliminates the need for long laces and all of the drawbacks associated with same. This disclosure will also adapt to existing equipment without the need of modifying the equipment.

In one aspect of the disclosure, there is provided a system for connecting a goalie pad to a hockey skate comprising a toe hook including a flat portion and a hook portion, the toe hook for integration with the goalie pad; and an elastic extension having a first end connected to the hockey skate and a second end for connection with the hook portion.

In another aspect, there is provided a method of securing a hockey skate to a goalie pad comprising attaching a toe hook to the goalie pad; connecting a first end of an elastic extension to the hockey skate; and connecting a second end of the elastic extension to a hook portion of the toe hook.

BRIEF DESCRIPTION OF THE DRAWINGS

Embodiments of the present disclosure will now be described, by way of example only, with reference to the attached Figures.

FIG. 1 is a perspective view of an embodiment of a toe hook;

FIG. 2 is a perspective view of an embodiment of a toe hook extension;

FIG. 3 is a perspective view of a goalie skate;

FIG. 4 is a perspective view of a goalie leg pad;

FIG. 5 is a perspective view of the toe hook being attached to the goalie leg pad;

FIG. 6 is a perspective view of the toe hook attached to the goalie leg pad;

FIG. 7 is a bottom view of the goalie skate having the toe hook extension attached;

FIG. 8 is a side view of the goalie skate with the toe hook extension attached;

FIG. 9 is an underside perspective view of the goalie skate connected to the goalie leg pad in one embodiment of the disclosure.

DETAILED DESCRIPTION

The present disclosure is directed at a method and apparatus for securing a goalie leg pad to a goalie skate. An advantage of the method and apparatus of the disclosure is that the leg pad may be secured to the skate with minimal effort and improved reliability with no physical modification needed to the existing goalie equipment.

In one embodiment, the apparatus of the disclosure is formed out of stamped metal to fit the front of a toe bridge of a goalie leg pad. In some embodiments, the apparatus, or goalie toe hook, replaces the need for long laces which currently provide similar functionality for goalies.

Turning to FIG. 1, a perspective view of a toe hook is shown. The toe hook, which is preferably used by goalies, 10 comprises a flat portion 12 and a hook portion 14 with a set of holes 16 located within the flat portion 12. In the present embodiment, the number of holes in the set of holes 14 is two. In the preferred embodiment, the toe hook 10 is made of a piece of metal which is stamped and formed to produce the hook portion 14 and the set of holes 16. The set of holes 16 is designed to help in securing the goalie toe hook to a goalie pad (as will be described in more detail below). While the size of the goalie toe hook 10 may be varied, in a preferred embodiment, the width of the hook 10 is approximately 1.5 inches, however, the width of the toe hook is preferably not wider than the width of the skate.

Turning to FIG. 2, a perspective view of a toe hook extension is shown. The extension 18, which may also be seen as an elastic extension, comprises a pair of loop portions which may be seen as a small loop portion 20 and a large loop portion 22. In one embodiment, the elastic extension 18 is approximately 2.25 inches in length in its rest position, or non-stretched position. As will be described, the elastic extension 18 is used in conjunction with the toe hook 10 to provide the apparatus for securing the goalie leg pad with the goalie skate.

Turning to FIG. 3, a perspective view of a goalie skate is provided. The goalie skate 24 comprises a boot portion 26, a cowl/blade support portion 28 and a metal blade 30. As will be understood, skates are typically worn in pairs, with left and right skates being mirror images of each other. The metal blade 30 is securely attached to the cowl/blade support 28 which is preferably made from a hard plastic-like material. The cowl/blade support 28 includes a front post 32 which serves as a contact point for the elastic extension when the goalie pad is attached to the skate 34. A front support opening 33 is located directly behind the front post 32.

Turning to FIG. 4, a perspective view of a goalie leg pad is shown. The goalie leg pad 34 is typically formed to fit a goalie's leg. In most embodiments, the goalie leg pad 34 includes a padded portion 38 which is foam-filled and covered in leather or a leather-like material and a toe bridge portion 40 (located in a toe area of the goalie pad 34). As shown, the to bridge portion 40 includes a set of holes 42. As with the goalie skates, the goalie leg pads are typically worn in pairs with left and right pads being mirror images of each other. The goalie pad 34 includes a plurality of straps 36 and buckles on the backside of the goalie leg pad. (not shown) in order to secure the goalie pad against the goalie's leg. While the goalie pad dimensions are variable and may be custom-made to fit a goalie's specifications, typically, the goalie pad ranges from 2 to 3 feet in height, 10 to 12 inches in width with a thickness of 2 to 3 inches.

Turning to FIG. 5, a perspective view of a toe hook being attached to a goalie pad is provided. In order to secure the toe hook 10 to the outside of the toe bridge portion 40, the set of holes 16 in the toe hook 10 are aligned with the set of holes 42 in the toe bridge portion 40 and then fasteners 44, such as screws 46 and screw inserts 48, are used to secure the toe hook 10 to the goalie pad 34. When secured, the hook portion 14 opens upward on the toe bridge portion 40 as illustrated in FIG. 6 which is a perspective view of the toe hook 10 attached to the goalie leg pad 34.

Once secured to the goalie pad (by means of the fasteners 44), the present disclosure provides a goalie toe hook 10 with a curved hook, pointing upward, on the front of the toe bridge portion 40 of the goalie pad 34. In the preferred set up, the toe hook 10 is positioned at a point where current long laces attach to tie a goalie leg pad in order to tie the leg pad to the goalie skate. In a preferred embodiment, the fasteners 44 fit into the set of holes 42 vacated by the former laces such that holes do not need to be cut into existing goalie leg pads as these holes are already present to receive the long laces.

Turning to FIG. 7, a bottom view of a goalie skate having the extension connected is shown and FIG. 8 is a side view of FIG. 7. As shown, the elastic extension 18 may be secured to the front post 32 of the goalie skate 26 via a connector 50 such as a nylon cable tie. The connector 50 may be laced through the small loop portion 20 of the elastic extension 18 and then through the front support opening 33 before being closed to form a loop. Any excess of the connector 50 may then be cut away so that it does not interfere or get in the way of the goalie pad or goalie skate.

In the example where the connector 50 is a nylon cable tie, the cable tie may be secured or threaded through the small loop portion 20 of the elastic extension 18 and then secured as tight as possible while maintaining the position of the elastic extension 18 in front of the front post 32.

Turning to FIG. 9, a view of the apparatus is shown. After the toe hook 10 has been secured to the goalie pad 34 and the elastic extension 18 secured to the goalie skate 24, the elastic extension 18 may then be stretched to connect the large loop portion 22 with the hook portion 14 of the toe hook 10 thereby somewhat securing the goalie pad 34 with the goalie skate 24. The large loop portion 22 of the extension 18 is pulled up into the hook 10 to provide a secure connection or attachment between the goalie pad and the goalie skate while providing the user with the needed flexibility to move around and block pucks from entering the net. The skate 24 and goal pad 34 can then be attached to the goalie's leg in the usual manner via the straps and buckles. When the game or practice has been completed, removing the goal pad 34 is just as simple by lifting the large loop portion 22 over the hook portion 14 and sliding the elastic extension 18 out from the hook 10.

In use, if the toe hook 10 is bent tight or closed such as by a hard shot or contact with a goal post, the hook portion 14 may be re-opened via a tool, such as a flat head screwdriver.

One example of how the present disclosure may be installed (although other methods are possible) includes 1. Thread the connector through the elastic extension's smaller loop.
2. Turn your skate over and wrap the connector around the front post of the goal skate.
3. Slide the thin end of the connector through the head of the connector, keeping the elastic extension at the front of the skate (FIG. 7).
4. Secure as tight as possible. Cut the excess connector away about ¼" from the cable tie head (FIG. 8).
5. Repeat for the other skate.
6. Remove the laces from the toe bridge of the goalie leg pad.
7. Position the Toe Hook on the bridge of the goal pad with the hook facing upward. Line up with the holes vacated by the laces (FIG. 5).
8. Secure the Toe Hook with machine screws and t-nut inserts as tight as possible. The use of a threadlocker is recommended.
9. Repeat for other pad.
10. To attach, slide the loop on the goal skate into the Toe Hook and pull down into place (FIG. 9). Finish securing the skate and leg pad as usual.
11. To remove, simply roll the loop over the hook and slide out.

In the preceding description, for purposes of explanation, numerous details are set forth in order to provide a thorough understanding of the embodiments of the disclosure. However, it will be apparent to one skilled in the art that these specific details are not required in order to practice the disclosure.

The above-described embodiments of the disclosure are intended to be examples only. Alterations, modifications and variations can be effected to the particular embodiments by those of skill in the art without departing from the scope of the disclosure.

The invention claimed is:
1. Apparatus for use with a hockey skate comprising:
a goalie pad;

a toe hook including a flat portion and a hook portion, the toe hook for connecting with the goalie pad; and an elastic extension having a first end, a second end, and a connector at the first end for connecting the apparatus to the hockey skate and the second end for connection with the hook portion.

2. The apparatus of claim 1 wherein the connector is a cable tie.

3. The apparatus of claim 1 wherein the toe hook further comprises a set of holes in the flat portion.

4. The apparatus of claim 3 further comprising a set of fasteners for securing the toe hook with the goalie pad through the set of holes.

5. The apparatus of claim 4 wherein the set of fasteners comprises:

a set of screws; and a set of screw inserts.

6. The apparatus of claim 1 wherein a width of the toe hook is less than a width of the hockey skate.

7. The apparatus of claim 1 wherein the elastic extension comprises:

a small loop portion; and a large loop portion.

8. The apparatus of claim 7 wherein the small loop portion is the first end and the large loop portion is the second end.

* * * * *